US008248978B2

(12) United States Patent
Zhang et al.

(10) Patent No.: US 8,248,978 B2
(45) Date of Patent: Aug. 21, 2012

(54) DETECTION OF STATIONS FOR WIRELESS COMMUNICATION (75) Inventors: Xiandong Zhang, Westford, MA (US); Mark S. Wallace, Bedford, MA (US); J. Rodney Walton, Carlisle, MA (US)

(73) Assignee: Qualcomm Incorporated, San Diego, CA (US)

( * ) Notice: Subject to any disclaimer, the term of this patent is extended or adjusted under 35 U.S.C. 154(b) by 1025 days.

(21) Appl. No.: 11/536,193

(22) Filed: Sep. 28, 2006

(65) Prior Publication Data

US 2008/0043778 A1 Feb. 21, 2008

Related U.S. Application Data (60) Provisional application No. 60/792,027, filed on Apr. 12, 2006.

(51) Int. Cl.
*G08C 17/00* (2006.01)
(52) U.S. Cl. ............ 370/311; 455/343.2; 455/343.4; 370/318; 370/338; 340/7.34; 340/7.38
(58) Field of Classification Search .......... 370/304, 370/324, 350, 498, 503, 509, 210, 512–513, 370/311, 318, 338; 455/127.5, 343.1, 343.2, 455/343.4, 343.5, 522, 572–574, 231; 340/7.32–7.38; 709/227, 228, 229
See application file for complete search history.

(56) References Cited

U.S. PATENT DOCUMENTS

| 7,508,781 | B2* | 3/2009 | Liu et al. ............ 370/311 |
| 2005/0032556 | A1* | 2/2005 | Bennett et al. ......... 455/574 |
| 2005/0054357 | A1* | 3/2005 | Takiishi et al. ......... 455/502 |
| 2005/0111488 | A1 | 5/2005 | Subramanian et al. |
| 2005/0177639 | A1 | 8/2005 | Reunamaki et al. |
| 2006/0072510 | A1 | 4/2006 | Aizawa |

(Continued)

FOREIGN PATENT DOCUMENTS

EP    15/8086    9/2005

(Continued)

OTHER PUBLICATIONS

International Search Report- PCT/US2007/066492, International Searching Authority- European Patent Office—Oct. 17, 2007.

(Continued)

*Primary Examiner* — Anthony Addy
*Assistant Examiner* — Khalid Shaheed
(74) *Attorney, Agent, or Firm* — Qualcomm Patent Group; Dimitry R. Milikovsky; James H. Yancey, Jr.

(57) ABSTRACT

Techniques for detecting other stations in a power efficient manner are described. A station may operate in a passive mode or a search mode. In the passive mode, the station receives for one receive period in each time interval. In the search mode, the station transmits for a series of transmit periods in one time interval, then receives for one receive period in the next time interval, and repeats the transmit/receive cycle. In an example scenario, station A operates in the search mode and sends a series of transmissions during its transmit periods. Station B operates in the passive mode, receives a transmission from station A during its receive period, switches to the search mode, and sends a series of transmissions for one time interval. Station A receives a transmission from station B during its receive period. After detecting one another, stations A and B may perform synchronization.

30 Claims, 8 Drawing Sheets

U.S. PATENT DOCUMENTS

| | | | |
|---|---|---|---|
| 2006/0146887 A1* | 7/2006 | Muguruma et al. | 370/503 |
| 2006/0165024 A1* | 7/2006 | Iwami et al. | 370/315 |
| 2006/0221927 A1* | 10/2006 | Yamada et al. | 370/345 |
| 2007/0064742 A1* | 3/2007 | Shvodian | 370/503 |

FOREIGN PATENT DOCUMENTS

| | | |
|---|---|---|
| JP | 2005151525 A | 6/2005 |
| RU | 2136113 | 8/1999 |
| RU | 2176131 | 11/2001 |

OTHER PUBLICATIONS

Written Opinion- PCT/US2007/066492, International Searching Authority- European Patent Office—Oct. 17, 2007.

International Preliminary Report on Patentability- PCT/US2007/066492, International Bureau of WIPO- Geneva, Switzerland—Oct. 14, 2008.

TTA, "Specifications for 2.3GHZ band Portable Internet Service: Physical & Medium Access Control Layer," TTAS.KO-06.0082, Jun. 29, 2005.

KIPO Office Action for Korean Application No. (PCT) 10-2008-7027602,dated Dec. 27, 2010 and English Language Translation Provided by Korean Local Counsel.

Decision on Grant Patent for Invention for Russian Application No. 2008144570,dated Sep. 3, 2010 and English Translation provided by Russian Local Counsel.

Taiwan Search Report—TW096112921—TIPO—Apr. 25, 2011 (060325TW).

* cited by examiner

DETECTION OF STATIONS FOR WIRELESS COMMUNICATION

The present application claims priority to provisional U.S. Application Ser. No. 60/792,027, entitled "POWER SAVING FOR PEER-TO-PEER SYNCHRONIZATION BETWEEN MIMO STATIONS," filed Apr. 12, 2006, assigned to the assignee hereof and incorporated herein by reference.

BACKGROUND

I. Field

The present disclosure relates generally to communication, and more specifically to techniques for detecting stations for wireless communication.

II. Background

Wireless communication networks are widely deployed to provide various communication services such as voice, video, packet data, messaging, and so on. These networks may be capable of supporting communication for multiple users by sharing the available network resources. Examples of such networks include wireless local area networks (WLANs), wireless wide area networks (WWANs), and wireless metropolitan area networks (WMANs).

IEEE 802.11 supports the creation of ad hoc wireless networks. When a station is powered on or moves into a new area, the station listens for a beacon transmitted by an access point. If the station receives the beacon, then the station may send a probe request to the access point. The station may then perform synchronization and associate with the access point. Thereafter, the station and the access point may communicate as specified by IEEE 802.11. If the station does not receive a beacon, then the station may become an access point and start transmitting a beacon periodically, e.g., every 10 to 100 milliseconds (ms). Between beacon transmissions, the station would switch to a receive mode and listen for access probes sent by other stations.

A station may thus either (1) turn on its receiver all the time to listen for a beacon from an access point or (2) alternately turn on its transmitter and receiver when assuming the role of an access point. In either case, the station may consume large amount of battery power to detect other stations. There is therefore a need in the art for techniques to more efficiently detect other stations.

SUMMARY

Techniques for detecting other stations in a power efficient manner are described herein. In an embodiment, a station may operate in a passive mode or a search mode. In the passive mode, the station operates one or more receivers for one receive period in each time interval. In the search mode, the station transmits for a series of transmit periods in one time interval, then receives for one receive period in the next time interval, and repeats the transmit/receive cycle. The durations of the time interval, the receive period, and the transmit period may be selected to achieve good detection performance and low power consumption.

In an embodiment of an example detection scenario, station A initially operates in the search mode, and station B initially operates in the passive mode. Station A sends a series of transmissions during its transmit periods. Station B receives a transmission from station A during its receive period, switches to the search mode, and sends a series of transmissions for one time interval. Station A receives a transmission from station B during its receive period. After the transmissions from station B are completed, each station will have detected the other station, and stations A and B may perform synchronization.

In an aspect, an apparatus is provided that includes a processor and a memory. The processor may be configured to operate at least one transmitter for multiple transmit periods in a first time interval, and to operate at least one receiver for a receive period in a second time interval after the first time interval.

In other aspects, a method and means may also be provided to operate at least one transmitter for multiple transmit periods in a first time interval, and to operate at least one receiver for a receive period in a second time interval after the first time interval. The method may be embodied in instructions stored on a processor readable media.

In further aspects, an apparatus is provided that includes a processor and a memory. The processor may be configured to operate at least one receiver, at a station, for at least one receive period, to detect for a transmission from another station during the at least one receive period, and to operate at least one transmitter, at the station, for multiple transmit periods after detecting the transmission from the station.

In additional aspects, a method and means may also be provided operate at least one receiver, at a station, for at least one receive period, to detect for a transmission from another station during the at least one receive period, and to operate at least one transmitter, at the station, for multiple transmit periods after detecting the transmission from the station. The method may be embodied in instructions stored on a processor readable media.

Various aspects and features of the disclosure are described in further detail below.

DETAILED DESCRIPTION

The detection techniques described herein may be used for various wireless communication networks such as WLANs, WWANs, WMANs, and so on. The terms "network" and "system" are often used interchangeably. A WLAN may implement one or more standards in the IEEE 802.11 family of standards. A WWAN may be a Code Division Multiple Access (CDMA) network, a Time Division Multiple Access (TDMA) network, a Frequency Division Multiple Access (FDMA) network, an Orthogonal FDMA (OFDMA) network, etc. A multiple-access network may support communication for multiple users by sharing the available network resources. The techniques may also be used for mesh networks composed of modes capable of forwarding traffic for other nodes. For clarity, the techniques are described below for an IEEE 802.11 WLAN.

Figure 1:
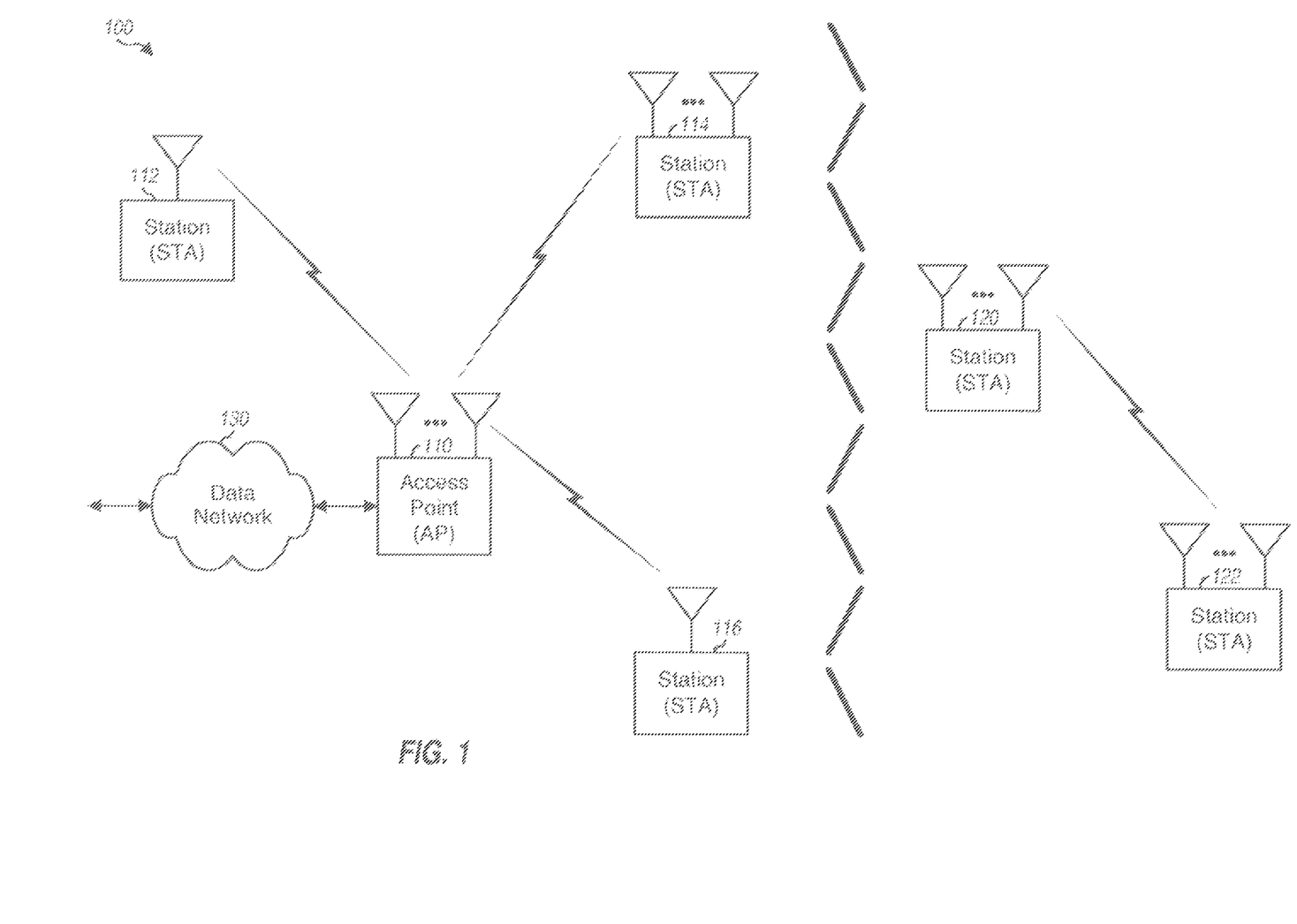
FIG. 1 shows a wireless network with an access point and multiple stations.

FIG. 1 shows a wireless network 100 with an access point (AP) 110 and multiple stations (STAs). In general, a wireless network may include any number of access points and any number of stations. A station is a device that can communicate with another station via a wireless medium. A station may also be called, and may contain some or all of the functionality of, a terminal, an access terminal, a user terminal, a mobile station, a mobile, a remote station, a user equipment, a user device, a user agent, a subscriber station, a subscriber unit, and so on. A station may be a cellular phone, a cordless phone, a Session Initiation Protocol (SIP) phone, a wireless local loop (WLL) station, a handheld device, a wireless device, a personal digital assistant (PDA), a laptop computer, a computing device, a wireless modem card, a media device (e.g., an HDTV, a DVD player, a wireless speaker, a camera, a camcorder, a webcam, etc.), and so on. An access point is a station that provides access to distribution services via the wireless medium for stations associated with that access point. An access point may also be called, and may contain some or all of the functionality of, a base station, a base transceiver subsystem (BTS), a Node B, and so on. Access point 110 may couple to a data network 130 and may communicate with other devices via network 130.

Access point 110 periodically transmits a beacon that carries a preamble, an access point identifier (AP ID), and a list of parameters for operation in a network formed by the access point. Stations 112, 114 and 116 are within the coverage of access point 110 and can detect the beacon. Stations 112, 114 and 116 may perform synchronization and are associated with access point 110. Thereafter, stations 112, 114 and 116 may communicate with access point 110.

In FIG. 1, stations 120 and 122 are not within the coverage of access point 110 and do not detect the beacon transmitted by the access point. Stations 120 and 122 may operate in a peer-to-peer mode and communicate directly with each other. However, before peer-to-peer communication can commence, each station needs to detect the other station and perform synchronization. Initially, when station 120 is powered on or moves into a new area, station 120 is not aware of the presence of any nearby station. Station 120 may listen for a beacon for a period of time. If a beacon is not received, then station 120 may become an access point and transmit a beacon periodically. Station 120 may listen for access probes sent by other stations between the beacon transmissions. In FIG. 1, station 122 is within the coverage of station 120 and detects the beacon from station 120. Stations 120 and 122 may perform synchronization to obtain timing and other pertinent information and may thereafter operate in a more power efficient manner.

Station 120 has no knowledge of when another station may appear and typically listens during the entire period between its beacon transmissions. Station 120 may wait a long time before receiving an access probe from another station or, even worse, may never receive an access probe. Station 120 may consume large amount of battery power trying to detect other stations. Station 120 may be equipped with multiple antennas and may turn on multiple receivers when listening for transmissions from other stations. In this case, station 120 may consume more battery power than a single-antenna station in the same situation. The higher power consumption may adversely impact battery life, which may then shorten standby time between battery recharges and talk time when a call is placed or received.

In an aspect, a detection scheme that may be used to detect other stations in a power efficient manner is described. The detection scheme allows a station to detect other stations while turned on for only a fraction of the time and still achieve good detection performance. The detection scheme may significantly reduce power consumption during the time waiting for another station. The detection scheme may be used for stations equipped with a single antenna as well as stations equipped with multiple antennas.

In an embodiment, the detection scheme supports two modes—a passive mode and a search mode. A station may operate in either the passive mode or the search mode at any given moment and may switch between the two modes as described below. A station may use the passive mode to detect for transmissions from other stations. A station may use the search mode to inform other stations of that station's presence as well as to detect for transmissions from other stations.

The transmission timeline may be partitioned into time intervals. The duration of one time interval is referred to as the sync time. The detection scheme allows one station to detect another station in the sync time, on average. The sync time may be selected based on various factors such as the desired detection speed, the desired power saving, and so on. A sync time of approximately 1 second would be comparable to the amount of time for a base station to detect a cellular phone (station). Other durations may also be used for the sync time. All stations may use the same sync time for good detection performance, although this is not required.

Figure 2:
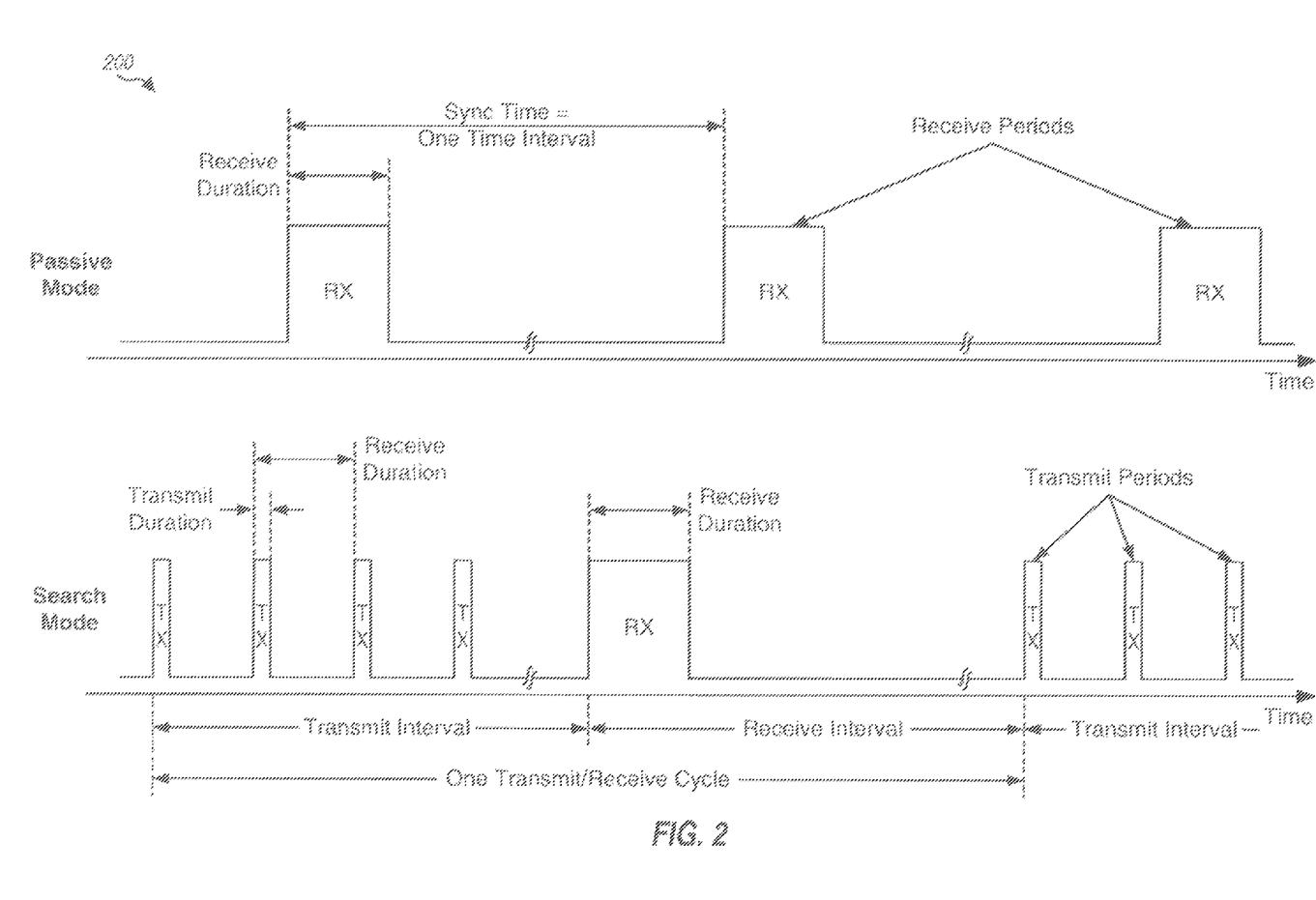
FIG. 2 shows a passive mode and a search mode for peer detection.

FIG. 2 shows an embodiment of the passive mode. In this embodiment the passive mode includes one receiver on time period in each time interval. A receiver on time period (or simply, a receive period) is a period during which a station turns on one or more receivers to listen for transmissions from other stations. The duration of the receive period is referred to as the receive duration and is denoted as RX. Since the stations are typically not synchronized, the timing of each station will be different from the timing of other stations. The start of the receive periods of a given station may thus appear at random times to other stations.

FIG. 2 also shows an embodiment of the search mode. In this embodiment, the search mode includes a series of transmit/receive cycles. Each transmit/receive cycle includes one time interval with a series of transmitter on time periods followed by another time interval with one receiver on time period. A transmitter on time period (or simply, a transmit period) is a period during which a station transmits to permit detection of this station by other stations. The duration of the transmit period is referred to as the transmit duration and is denoted as TX. The receiver on time period in the search mode may be the same as the receiver on time period in the passive mode.

The receive duration may be defined to be longer than the transmit duration, which may not cause excessive battery drain because power consumption is typically less for reception than transmission. One transmit period may be present in each receive period, and the time duration between consecutive transmit periods may be equal to or less than the receive duration. This ensures that a transmission from one station in one transmit period can be received by another station in one receive period.

Figure 3:
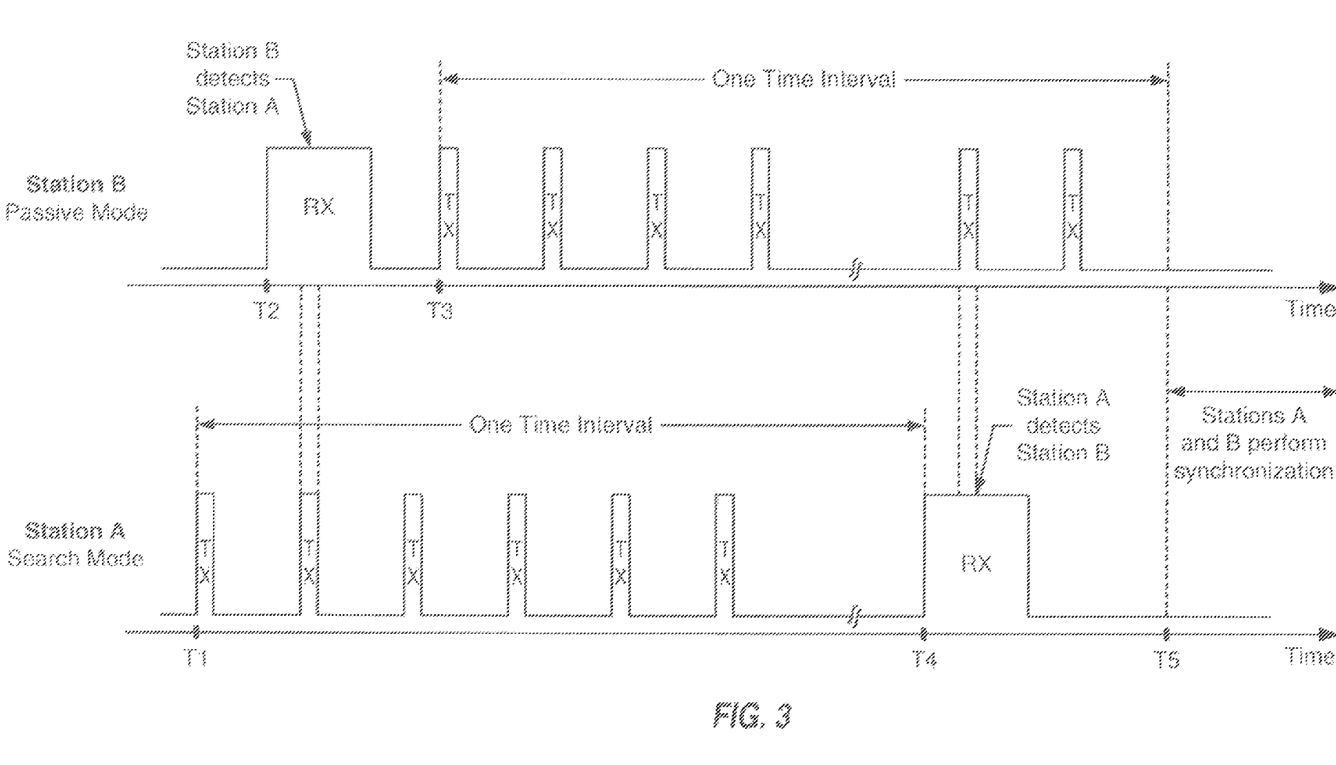
FIG. 3 shows operation of two stations to detect one another.

FIG. 3 shows operation of two stations to detect one another. Station A initially operates in the search mode, and station B initially operates in the passive mode. Station A sends a series of transmissions during the transmit periods starting at time T1. Station B receives a transmission from station A during its receive period starting at time T2. Upon receiving the transmission from station A, station B switches to the search mode and sends a series of transmissions for one time interval starting at time T3. Each transmission from station B allows station A to detect station B. Station A receives a transmission from station B during the receive period starting at time T4. At time T5, the transmissions from station B are completed. Stations A and B may thereafter perform synchronization, e.g., in accordance with the information included in the transmission from station B.

Two stations may be in the search mode and their transmit and receive time intervals may initially overlap one another. Typical frequency error in their clocks will offset their timing after certain amount of time, and the two stations will be able to detect one other.

A transmission or a packet sent during a transmit period in the search mode may include various types of information applicable for peer-to-peer communication. A transmission from station A in FIG. 3 may include any of the information sent in a beacon in IEEE 802.11 such as a timestamp, capability information, identification information, and so on. The transmission from station A may also include a station address, transmit/receive time intervals, sequence number of transmit pulse, station capacity, supported modes and rates, and so on. A transmission or a packet sent in response to detecting a transmission from another station may also include various types of information applicable for peer-to-peer communication. A transmission from station B in FIG. 3 may include a station address, a timestamp, capability information (e.g., supported modes and rates), and so on. The transmission from station B may also include pertinent information for a synchronization procedure, e.g., an indication as to which station will transmit next and when.

A station typically utilizes a crystal oscillator to provide relatively precise frequency, although other oscillators may also be utilized. IEEE 802.11 requires the oscillator frequency error to be within ±20 parts per million (ppm). The crystal oscillator does not provide accurate absolute time. Hence, the start of the transmit periods and/or the receive periods of the station will appear at random times to other stations. However, the transmit duration, receive duration, and sync time are relatively accurate (e.g., to within 0.008%) for the stations.

The embodiment in FIGS. 2 and 3 exploits the accurate relative timing available at the stations. Since one transmit period is present in each receive period, station B operating in the passive mode can receive a transmission from station A even when station B turns on its receiver(s) for a small percentage (e.g., 1%) of the time. Furthermore, since station A transmits across an entire time interval in each transmit/receive cycle, station B will receive a transmission from station A in at most two receive periods. The average time to detect a station is thus the sync time.

The sync time, receive duration, and transmit duration may be selected in various manners. The transmit duration may be determined by the minimum amount of time to transmit a designated packet that allows other stations to detect the transmitting station. The transmit duration may thus be determined by various system parameters such as the system bandwidth or chip rate, the minimum packet size, and so on. In one design, the transmit duration is selected to be approximately 100 microseconds (μsec). Other transmit durations may also be used. The sync time may be selected based on various factors as described above and may be approximately 1 second. The receive duration may be selected as described below.

The receive duty cycle in the passive and search modes may be expressed as:

$$Drx = \frac{Trx}{Tsync},\qquad \text{Eq (1)}$$

where

Trx is the time duration in which the receiver(s) are turned on,

Tsync is the sync time, and

Drx is the receive duty cycle.

The transmit duty cycle in the search mode may be expressed as:

$$Dtx = \frac{Ttx}{Trx} = \frac{Ttx}{Tsync \cdot Drx},\qquad \text{Eq (2)}$$

where

Ttx is the time duration in which the transmitter(s) are turned on, and

Dtx is the transmit duty cycle.

From equation (2), the receive duration may be given as: Trx=Ttx/Dtx and is dependent on the transmit duration as well as the transmit duty cycle. For example, if the desired transmit duty cycle is 1%, then the receive duration may be given as Trx=100·Ttx.

The average power consumed in the search mode may be expressed as:

$$Pavg = \frac{1}{2} \cdot (Prx \cdot Drx + Ptx \cdot Dtx) = \frac{1}{2} \cdot \left(Prx \cdot Drx + Ptx \cdot \frac{Ttx}{Tsync \cdot Drx}\right).\qquad \text{Eq (3)}$$

where

Prx is the amount of power consumed when the receiver(s) are turned on.

Ptx is the amount of power consumed when the transmitter(s) are turned on, and

Pavg is the average power consumed in the search mode.

Figure 4:
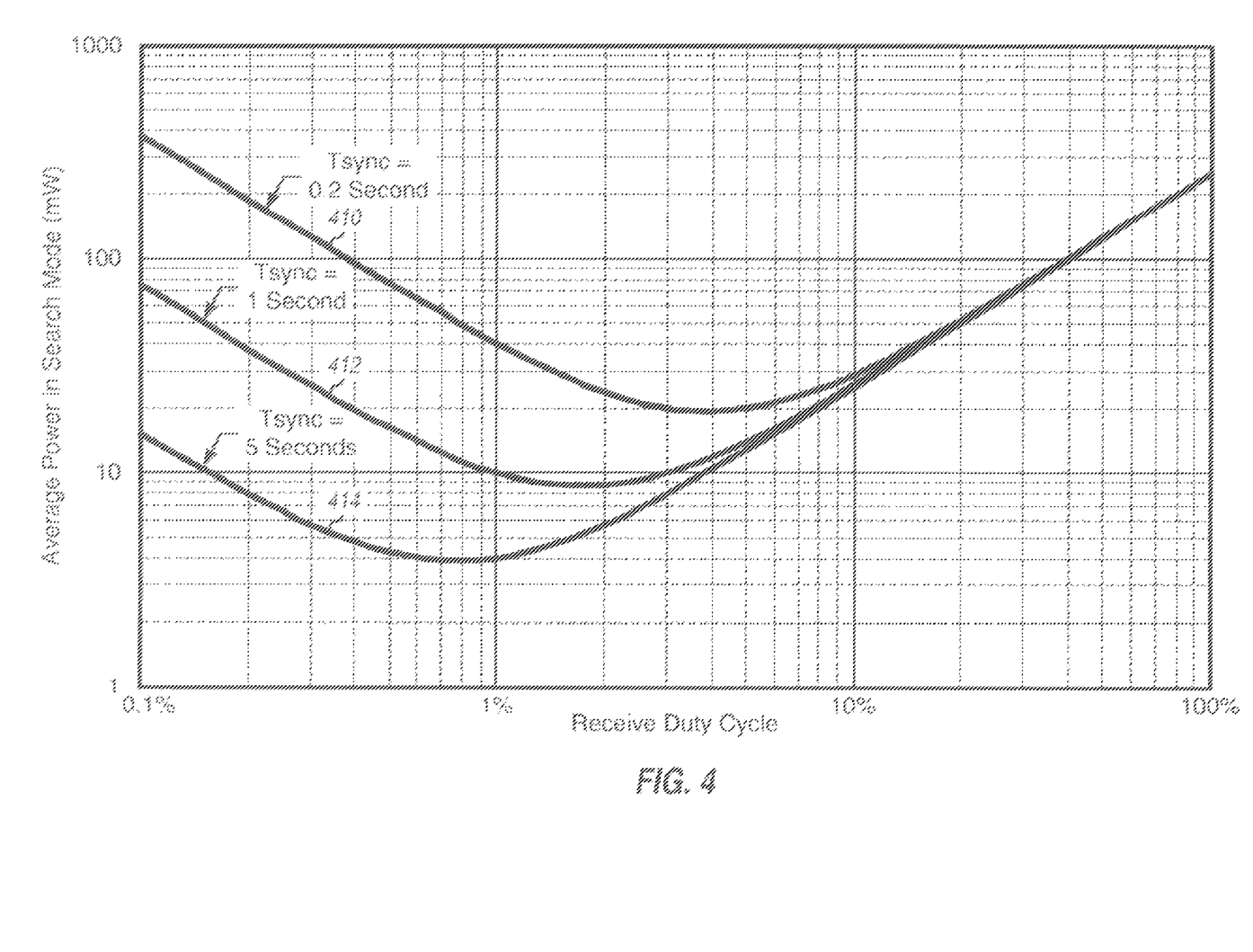
FIG. 4 shows plots of average power versus receive duty cycle.

FIG. 4 shows plots of average power in the search mode versus receive duty cycle for three different sync times. The plots are generated for an example in which Ttx=100 μsec, Prx=500 milliWatts (mW), and Ptx=1500 mW. Equation (3) may then be simplified as follows.

$$Pavg = \frac{1}{2}\left(500 \cdot Drx + 1500 \cdot \frac{0.0001}{Tsync \cdot Drx}\right).$$

Plot 410 shows the average power versus receive duty cycle (Drx) for the case in which Tsync=0.2 second. Plot 412 shows the average power versus receive duty cycle for the case in which Tsync=1 second. Plot 414 shows the average power versus receive duty cycle for the case in which Tsync=5 second. Table 1 gives the lowest average power (Min Pavg), the receive duty cycle (Drx), the transmit duty cycle (Dtx), the receive duration (Trx), and the transmit duration (Ttx) for sync times of 0.2 second, 1 second, and 5 seconds. Table 1 indicates that the lowest average power decreases for a longer sync time. Table 1 also indicates that the receive and transmit duty cycles generally decrease for a longer sync time. The values in Table 1 are for an example in which Ptx is three times Prx. Other values may be obtained for other Ptx to Prx ratios.

TABLE 1

| Tsync | Drx | Dtx | Trx | Ttx | Min Pavg |
|---|---|---|---|---|---|
| 0.2 second | 4.0% | 1.25% | 8 msec | 100 μsec | 19.3 mW |
| 1 second | 1.8% | 0.56% | 18 msec | 100 μsec | 8.7 mW |
| 5 seconds | 0.8% | 0.25% | 40 msec | 100 μsec | 3.9 mW |

In general, various values may be selected for the sync time, receive duration, and transmit duration. In one design, the sync time is approximately 1 second, the receive duration is approximately 10 ms, and the transmit duration is approximately 100 μsec. This design gives a receive duty cycle of 1% and a transmit duty cycle of 1%.

In both the passive mode and the search mode, a station may power down as much circuitry as possible between the transmit periods and/or receive periods. Since the transmit and receive duty cycles may be low. The station may be able to power down for a large percentage of time and may be able to substantially reduce power consumption. In the design described above with Tsync=1 second. Trx=10 ms, Ttx=100 μsec, Prx=500 mW, and Ptx=1500 mW, the average power is 10 mW. In comparison, a station that receives all the time would consume 500 mW, and a station that transmits a beacon periodically and receives between beacon transmissions would consume more than 500 mW. The detection techniques may thus substantially reduce power consumption, e.g., from 500 mW down to 10 mW.

Figure 5:
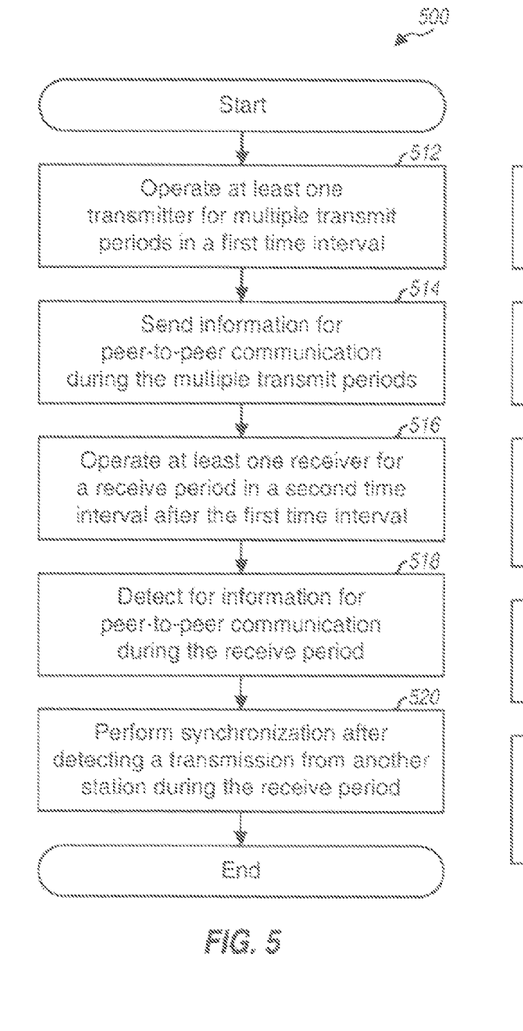
FIG. 5 shows a process to detect other stations in the search mode.

FIG. 5 shows a process 500 to detect other stations in the search mode. At least one transmitter is operated for multiple transmit periods in a first time interval (block 512). Information for peer-to-peer communications (e.g., such as any of the information described above) is sent during the multiple transmit periods (block 514). At least one receiver is operated for a receive period in a second time interval after the first time interval (block 516). Information for peer-to-peer communication may be detected from other stations during the receive period (block 518). The transmitter(s) and receiver(s) may be operated for a series of transmit/receive cycles, with each cycle comprising the first and second time intervals. Synchronization is performed after detecting a transmission from another station during the receive period (block 520).

Each transmit period may be a fraction of (e.g., at least ten times less than) the receive period. The receive period may be a fraction of (e.g., at least ten times less than) the second time interval, which may be equal to the first time interval. Each transmit period may be 100 μsec, and the receive period may be 10 msec. Some other durations may also be used for the transmit and receive periods. The time duration between consecutive transmit periods may be equal to or less than the duration of the receive period.

Figure 6:
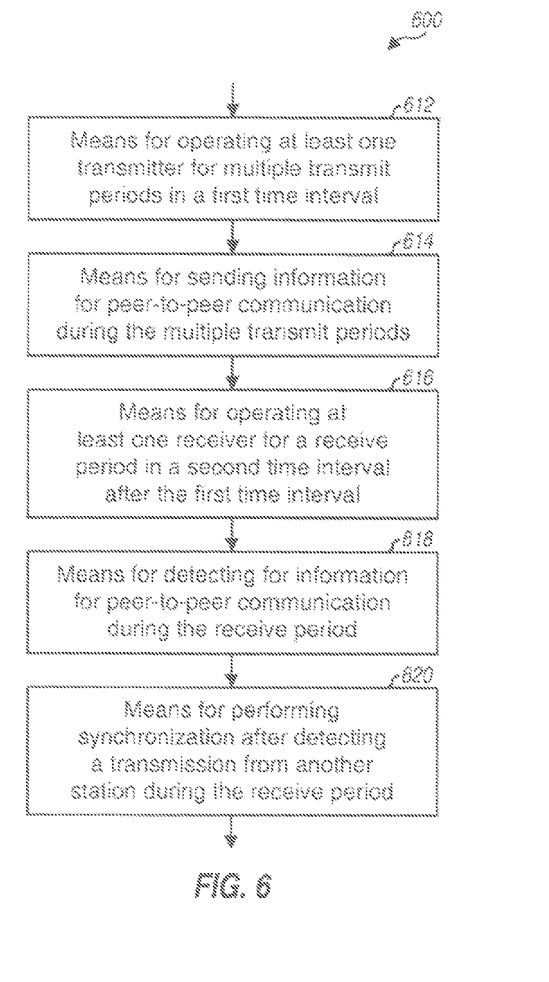
FIG. 6 shows an apparatus to detect other stations in the search mode.

FIG. 6 shows an apparatus 600 for detecting other stations in the search mode. Apparatus 600 includes means for operating at least one transmitter for multiple transmit periods in a first time interval (block 612), means for sending information for peer-to-peer communication during the multiple transmit periods (block 614), means for operating at least one receiver for a receive period in a second time interval after the first time interval (block 616), means for detecting for information for peer-to-peer communication from other stations during the receive period (block 618), and means for performing synchronization after detecting a transmission from another station during the receive period (block 620).

Figure 7:
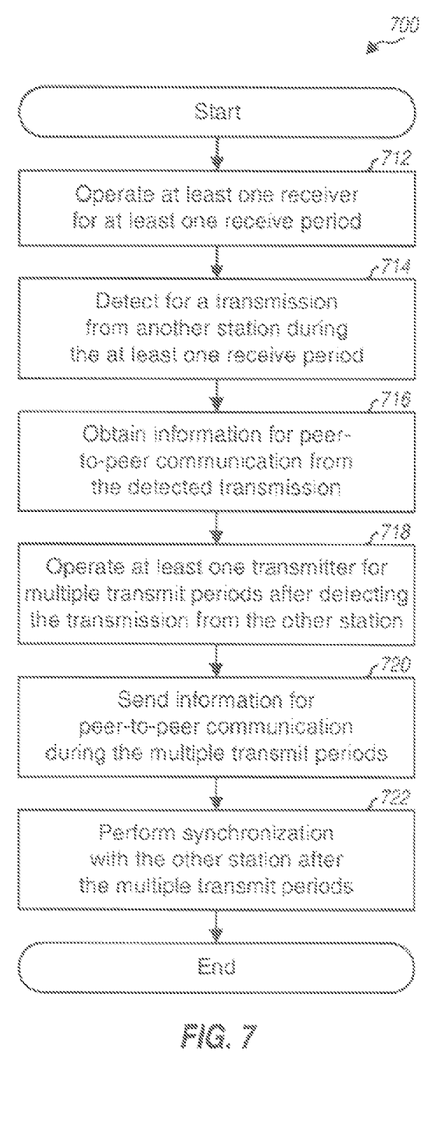
FIG. 7 shows a process to detect other stations in the passive mode.

FIG. 7 shows a process 700 to detect other stations in the passive mode. At least one receiver is operated for at least one receive period (block 712). A transmission from another station is detected during the at least one receive period (block 714). Information for peer-to-peer communication is obtained from the detected transmission (block 716). At least one transmitter is operated for multiple transmit periods after detecting the transmission from the other station (block 718). Information for peer-to-peer communication is sent during the multiple transmit periods (block 720). Synchronization is then performed with the other station after the multiple transmit periods (block 722).

Figure 8:
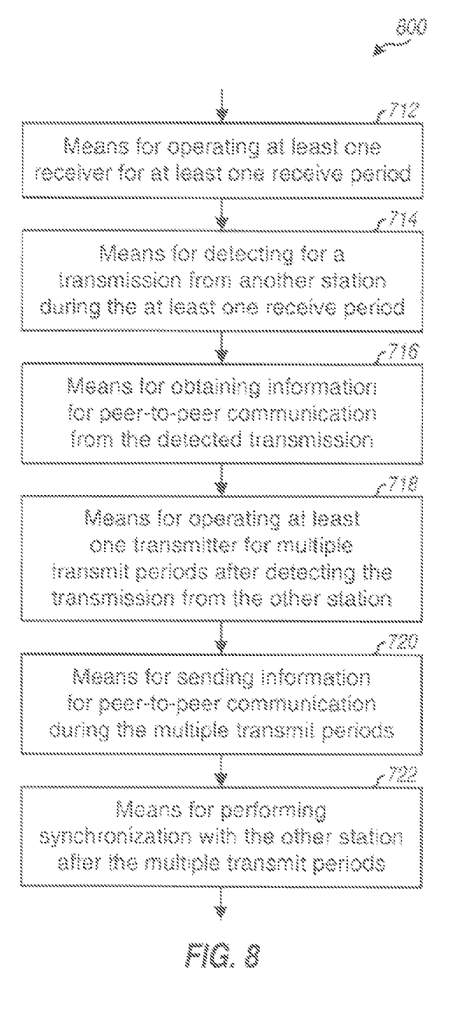
FIG. 8 shows an apparatus to detect other stations in the passive mode.

FIG. 8 shows an apparatus 800 for detecting other stations in the passive mode. Apparatus 800 includes means for operating at least one receiver for at least one receive period (block 812), means for detecting for a transmission from another station (block 814), means for obtaining information for peer-to-peer communication from the detected transmission (block 816), means for operating at least one transmitter for multiple transmit periods after detecting the transmission from the other station (block 818), means for sending information for peer-to-peer communication during the multiple transmit periods (block 820), and means for performing synchronization with the other station after the multiple transmit periods (block 822).

In the embodiments described above, a passive mode and a search mode are supported. A station may operate in the passive mode for a period of time before switching to the search mode. A station may also periodically or pseudo-randomly switch transmit and receive interval in the search mode, e.g., to avoid synchronization with the transmit/receive cycle of another station. In other embodiments, different and/or additional modes may also be supported.

The detection techniques described herein may be used for single-antenna stations as well as multi-antenna stations. A multiple-input multiple-output (MIMO) transmission may be sent from one station with multiple transmit antennas to another station with multiple receive antennas. MIMO may be used to increase throughput and/or improve reliability.

Figure 9:
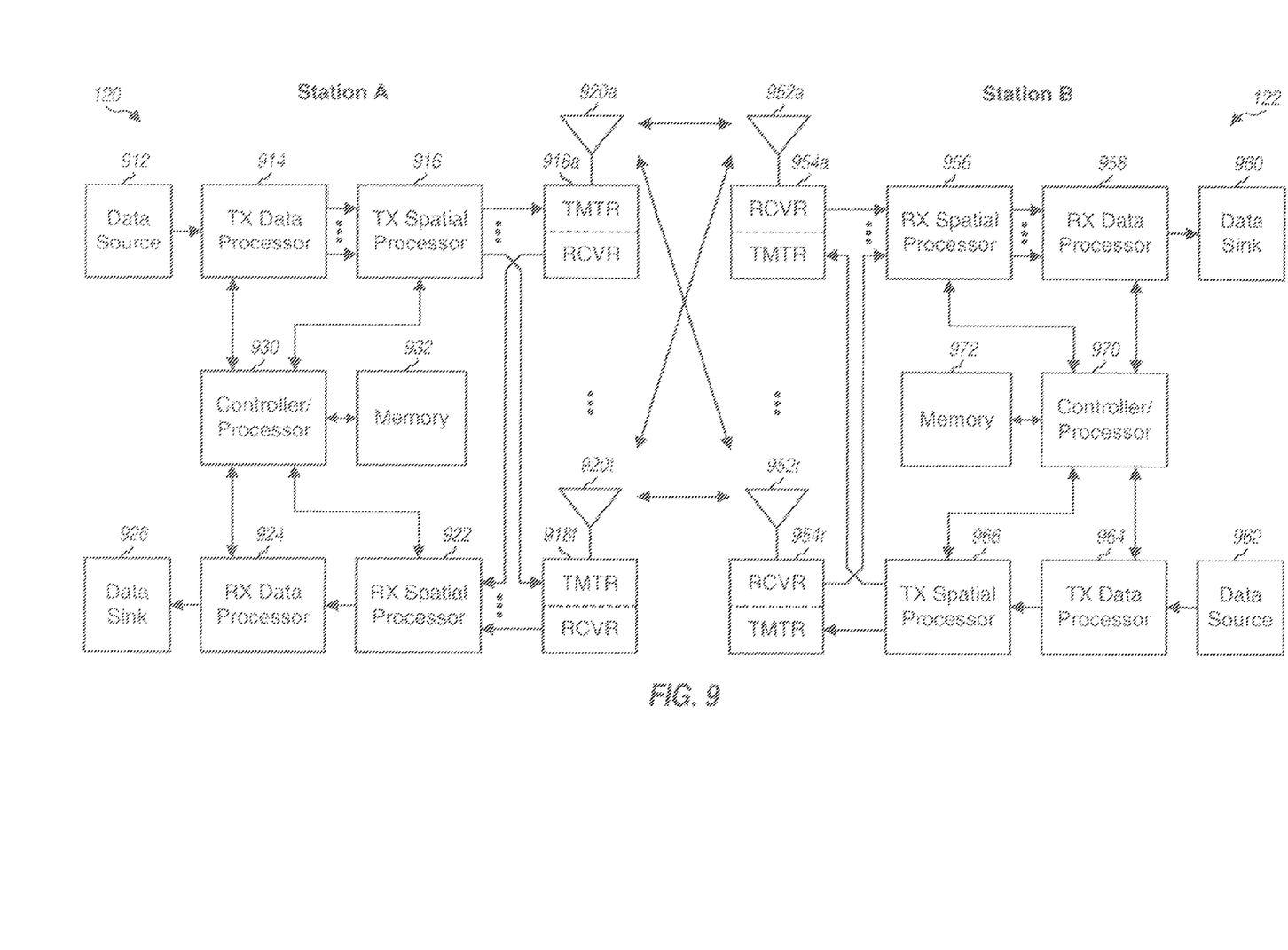
FIG. 9 shows a block diagram of two stations.

FIG. 9 shows a block diagram of stations 120 and 122 in FIG. 1. Station 120 is equipped with multiple (T) antennas, and station 122 is equipped with multiple (R) antennas. Each antenna may be a physical antenna or an antenna array.

At station 120, a transmit (TX) data processor 914 receives traffic data from a data source 912 and other data (e.g., information for peer-to-peer communication) from a controller 930. TX data processor 914 processes (e.g., formats, encodes, interleaves, and symbol maps) the data and generates data symbols. A TX spatial processor 916 multiplexes pilot symbols with the data symbols, performs transmitter spatial processing on the multiplexed data symbols and pilot symbols, and provides up to T output symbol streams for up to T transmitters (TMTR) 918a through 918t. Each transmitter 918 processes (e.g., modulates, converts to analog, filters, amplifiers, and upconverts) its output symbol stream and generates a modulated signal. Up to T modulated signals from transmitters 918a through 918t are transmitted from antennas 920a through 920t, respectively.

At station 122, R antennas 952a through 952r receive the modulated signals from station 120, and each antenna 952 provides a received signal to a respective receiver (RCVR) 954. Each receiver 954 processes (e.g., filters, amplifies, downconverts, digitizes, and demodulates) its received signal and provides received symbols. A receive (RX) spatial processor 956 performs detection on the received symbols and provides data symbol estimates. An RX data processor 958 further processes (e.g., deinterleaves and decodes) the data symbol estimates and provides decoded data to a data sink 960.

For transmission in the other direction, at station 122, traffic data from a data source 962 and other data (e.g., information for peer-to-peer communication) from a controller 970 are processed by a TX data processor 964, multiplexed with pilot symbols and spatially processed by a TX spatial processor 966, and further processed by up to R transmitters 954a through 954r to generate up to R modulated signals, which are transmitted via antennas 952a through 952r. At station 120, the modulated signals from station 122 are received by T antennas 920a through 920t, processed by up to T receivers 918a through 918t, spatially processed by an RX spatial processor 922, and further processed by an RX data processor 924 to recover the data sent by station 122.

Controllers/processors 930 and 970 control the operation at stations 120 and 122, respectively. Memories 932 and 972 store data and program codes for stations 120 and 122, respectively.

In general, for peer detection, any number of transmitters may be operated during the transmit periods, and any number of receivers may be operated during the receive periods. For example, one transmitter may be operated (e.g., at the maximum transmit power) during the transmit periods, and all receivers may be operated during the receive periods. The use of a single transmitter reduces power consumption and avoids unintended beamsteering that may occur with transmission from multiple antennas. The use of multiple (e.g., all) receivers provides receive diversity, improves detection performance, and may extend reception range.

Figure 10:
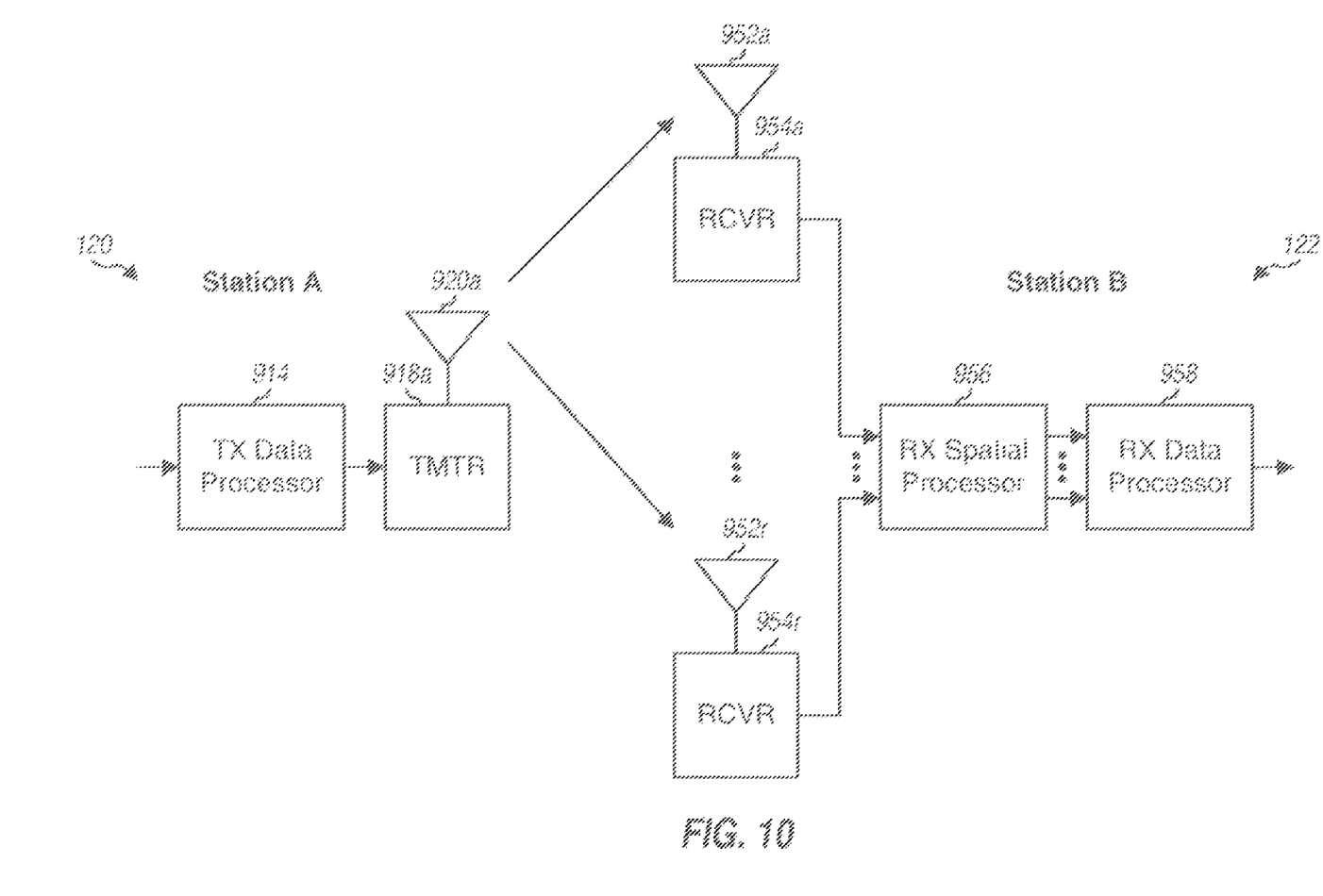
FIG. 10 illustrates the use of a single transmitter at one station and multiple receivers at another station for detection.

FIG. 10 illustrates the use of a single transmitter at station 120 and all receivers at station 122 for detection. At station 120, information for peer-to-peer communication is processed by TX data processor 914, passed through TX spatial processor 916 (not shown in FIG. 10), conditioned by transmitter 918a, and transmitted via antenna 920a. At station 122, the modulated signal from station 120 is received via antennas 952a through 952r, processed by RX spatial processor 956, and further processed by RX data processor 958 to recover the information for peer-to-peer communication sent by station 120. Station 122 may also send peer-to-peer communication via a single transmitter, and station 120 may receive the peer-to-peer communication via multiple receivers.

The detection techniques described herein may be implemented by various means. For example, these techniques may be implemented in hardware, firmware, software, or a combination thereof. For a hardware implementation, the processing units used to perform detection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with instructions (e.g., procedures, functions, modules, and so on) that perform the functions described herein. The instructions, which may be embodied as firmware and/or software codes, may be stored in a memory (e.g., memory 932 or 972 in FIG. 9) and executed by a processor (e.g., processor 930 or 970). The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus comprising:
   at least one processor configured to operate at least one transmitter for multiple transmit periods in a first time interval, and to operate at least one receiver for a receive period in a second time interval after the first time interval; and
   a memory coupled to the at least one processor,
   wherein each transmit period is a fraction of the receive period, the receive period is a fraction of the second time interval, and a time between consecutive transmit periods is equal to or less than a time of the receive period.

2. The apparatus of claim 1, wherein the at least one processor is configured to send information for peer-to-peer communication during the multiple transmit periods.

3. The apparatus of claim 1, wherein the at least one processor is configured to detect for information for peer-to-peer communication during the receive period.

4. The apparatus of claim 1, wherein the at least one processor is configured to perform synchronization with respect to another station after detecting a transmission from the another station during the receive period.

5. The apparatus of claim 1, wherein each transmit period is at least ten times less than the receive period.

6. The apparatus of claim 1, wherein the receive period is at least ten times less than the second time interval.

7. The apparatus of claim 1, wherein each transmit period is 100 microseconds and the receive period is 10 milliseconds.

8. The apparatus of claim 1, wherein the first time interval is equal to the second time interval.

9. The apparatus of claim 1, wherein the at least one processor is configured to operate the at least one transmitter and the at least one receiver for multiple transmit and receive cycles, each cycle comprising the first and second time intervals.

10. The apparatus of claim 1, wherein the at least one processor is configured to operate a single transmitter for the multiple transmit periods and to operate multiple receivers for the receive period.

11. A method comprising:
    operating at least one transmitter, of a station, for multiple transmit periods in a first time interval; and
    operating at least one receiver, of the station, for a receive period in a second time interval after the first time interval,
    wherein each transmit period is a fraction of the receive period, the receive period is a fraction of the second time interval, and a time between consecutive transmit periods is equal to or less than a time of the receive period.

12. The method of claim 11, further comprising:
    sending information for peer-to-peer communication during the multiple transmit periods; and
    detecting for information for peer-to-peer communication during the receive period.

13. The method of claim 11, further comprising:
performing synchronization with respect to another station after detecting a transmission from the another station during the receive period.

14. An apparatus comprising:
means for operating at least one transmitter for multiple transmit periods in a first time interval; and
means for operating at least one receiver for a receive period in a second time interval after the first time interval,
wherein each transmit period is a fraction of the receive period, the receive period is a fraction of the second time interval, and a time between consecutive transmit periods is equal to or less than a time of the receive period.

15. The apparatus of claim 14, further comprising:
means for sending information for peer-to-peer communication during the multiple transmit periods; and
means for detecting information for peer-to-peer communication during the receive period.

16. The apparatus of claim 14, further comprising:
means for performing synchronization with respect to another station after detecting a transmission from the another station during the receive period.

17. A non-transitory computer-readable medium including instructions stored thereon that may be utilized by one or more processors, the instructions comprising:
a first instruction set for operating at least one transmitter for multiple transmit periods in a first time interval; and
a second instruction set for operating at least one receiver for a receive period in a second time interval after the first time interval,
wherein each transmit period is a fraction of the receive period, the receive period is a fraction of the second time interval, and a time between consecutive transmit periods is equal to or less than a time of the receive period.

18. An apparatus comprising:
at least one processor configured to operate at least one receiver, at a station, for at least one receive period in a first time interval, to detect for a transmission from another station during the at least one receive period, and to operate at least one transmitter, at the station, for multiple transmit periods during a second time interval after detecting the transmission from the another station; and
a memory coupled to the at least one processor,
wherein each transmit period is a fraction of the receive period, the receive period is a fraction of the first time interval, and a time between consecutive transmit periods is equal to or less than a time of the receive period.

19. The apparatus of claim 18, wherein the at least one processor is configured to detect information for peer-to-peer communication during the at least one receive period.

20. The apparatus of claim 18, wherein the at least one processor is configured to send information for initiating peer-to-peer communication during the multiple transmit periods.

21. The apparatus of claim 18, wherein the information for initiating peer-to-peer communication comprises a timestamp.

22. The apparatus of claim 18, wherein the at least one processor is configured to perform synchronization with the another station after the multiple transmit periods.

23. The apparatus of claim 18, wherein the at least one processor is configured to operate multiple receivers for the at least one receive period and to operate a single transmitter for the multiple transmit periods.

24. A method comprising:
operating at least one receiver, at a station, for at least one receive period in a first time interval;
detecting a transmission from another station during the at least one receive period; and
operating at least one transmitter, at the station, for multiple transmit periods in a second time interval after detecting the transmission from the another station,
wherein each transmit period is a fraction of the receive period, the receive period is a fraction of the first time interval, and a time between consecutive transmit periods is equal to or less than a time of the receive period.

25. The method of claim 24, further comprising:
receiving information for peer-to-peer communication during the at least one receive period; and
sending information for peer-to-peer communication during the multiple transmit periods.

26. The method of claim 24, further comprising:
performing synchronization with the another station after the multiple transmit periods.

27. An apparatus comprising:
means for operating at least one receiver, at a station, for at least one receive period in a first time interval;
means for detecting a transmission from another station during the at least one receive period; and
means for operating at least one transmitter, from the station, for multiple transmit periods in a second time interval, after detecting the transmission from the another station,
wherein each transmit period is a fraction of the receive period, the receive period is a fraction of the first time interval, and a time between consecutive transmit periods is equal to or less than a time of the receive period.

28. The apparatus of claim 27, further comprising:
means for receiving information for peer-to-peer communication during the at least one receive period; and
means for sending information for peer-to-peer communication during the multiple transmit periods.

29. The apparatus of claim 27, further comprising:
means for performing synchronization with the station after the multiple transmit periods.

30. A non-transitory computer-readable medium including instructions stored thereon that may be utilized by one or more processors, the instructions comprising:
a first instruction set for operating at least one receiver for at least one receive period in a first time interval;
a second instruction set for detecting for a transmission from a station; and
a third instruction set for operating at least one transmitter for multiple transmit periods in a second time interval, and after detecting the transmission from the station,
wherein each transmit period is a fraction of the receive period, the receive period is a fraction of the first time interval, and a time between consecutive transmit periods is equal to or less than a time of the receive period.

* * * * *